(12) United States Patent
Moreman et al.

(10) Patent No.: US 8,458,303 B2
(45) Date of Patent: Jun. 4, 2013

(54) UTILIZING A GATEWAY FOR THE ASSIGNMENT OF INTERNET PROTOCOL ADDRESSES TO CLIENT DEVICES IN A SHARED SUBSET

(75) Inventors: Charles Moreman, Grayson, GA (US); William Francis Siadak, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 13/180,247

(22) Filed: Jul. 11, 2011

(65) Prior Publication Data

US 2012/0011230 A1    Jan. 12, 2012

Related U.S. Application Data

(60) Provisional application No. 61/363,489, filed on Jul. 12, 2010.

(51) Int. Cl.
*G06F 15/177* (2006.01)

(52) U.S. Cl.
USPC ............ 709/220; 709/221; 709/222; 709/245

(58) Field of Classification Search
USPC ... 709/220, 221, 222, 245; 726/4, 3; 370/328, 370/310; 455/445; 380/278; 713/155, 151
See application file for complete search history.

(56) References Cited

U.S. PATENT DOCUMENTS

| 2007/0101121 | A1* | 5/2007 | Henry et al. | 713/151 |
|---|---|---|---|---|
| 2008/0177998 | A1* | 7/2008 | Apsangi et al. | 713/155 |
| 2008/0285492 | A1* | 11/2008 | Vesterinen | 370/310 |
| 2009/0041252 | A1* | 2/2009 | Hanna | 380/278 |
| 2009/0233609 | A1* | 9/2009 | Iun et al. | 455/445 |
| 2010/0085920 | A1* | 4/2010 | Chari et al. | 370/328 |
| 2010/0121946 | A1* | 5/2010 | Claes et al. | 709/223 |
| 2011/0030032 | A1* | 2/2011 | Baykal et al. | 726/3 |
| 2011/0173678 | A1* | 7/2011 | Kaippallimalil et al. | 726/4 |

* cited by examiner

*Primary Examiner* — Le H Luu
(74) *Attorney, Agent, or Firm* — Merchant & Gould

(57) ABSTRACT

A gateway may be utilized to assign Internet protocol (IP) addresses to client devices in a shared subnet. The gateway may include a dynamic host protocol configuration (DHCP) proxy server. The proxy server may receive discover messages from the client devices. The proxy server may send proxy discover messages to a master DHCP server and receive offer messages containing IP addresses and local options. The proxy server may add/modify the local options to create proxy offer messages, send the proxy offer messages to the client devices and receive IP address request messages from the client devices. The proxy server may send proxy IP address request messages to the master DHCP server and receive acknowledgement messages. The proxy server may add/modify local options in the acknowledgement messages to create proxy acknowledgement messages and send the proxy acknowledgement messages to the client devices to assign the IP addresses and the local options.

20 Claims, 6 Drawing Sheets

UTILIZING A GATEWAY FOR THE ASSIGNMENT OF INTERNET PROTOCOL ADDRESSES TO CLIENT DEVICES IN A SHARED SUBSET

CROSS-REFERENCE TO RELATED APPLICATIONS

This utility application claims the benefit under 35 U.S.C. §119(e) of U.S. Provisional Patent Application No. 61/363, 489 filed on Jul. 12, 2010, which is hereby incorporated by reference in its entirety.

BACKGROUND

Residential gateways typically include a dynamic control configuration protocol ("DHCP") server to assign Internet protocol ("IP") addresses to in-home client computing devices. Some residential computing environments may include one or more DHCP servers which may be utilized to assign IP addresses to clients and assign local provisioning options which may include DNS parameters, default gateway parameters (next hop router) and other parameters to client devices within a common (shared) local network configured to share a subnet. For example, when a service provider is used to provide Internet connections to residential local network, the service provider may supply a residential gateway containing a DHCP server. This DHCP server may be configured to provide information to client devices including unique IP address within an IP subnet and other local provisioning options. When multiple service providers are used to provide service to the same residential local network, each service provider may supply a gateway containing a DHCP server. The use of multiple DHCP servers in a subnet, however, suffers from a number of drawbacks. One drawback is that when multiple DHCP servers are utilized in the same subnet, all local DHCP servers may attempt to respond simultaneously to client requests. When one of the DHCP servers reachable by clients may succeed in assigning a given client's IP address and local provisioning options, offers from the other DHCP servers may be ignored by the client. As a result, while a client device may be provisioned to access services from the service provider that succeeded in supplying the DHCP server, the client device may not be provisioned to access services from other service providers. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing a gateway for the assignment of Internet protocol ("IP") addresses to client devices in a shared subnet. The gateway may include a dynamic host protocol configuration ("DHCP") proxy server. The proxy server may receive discover messages from the client devices. The proxy server may send proxy discover messages to a master DHCP server and receive offer messages containing IP addresses and local options. The proxy server may add/modify the local options to create proxy offer messages, send the proxy offer messages to the client devices and receive IP address request messages from the client devices. The proxy server may send proxy IP address request messages to the master DHCP server and receive acknowledgement messages. The proxy server may add/modify local options in the acknowledgement messages to create proxy acknowledgement messages and send the proxy acknowledgement messages to the client devices to assign the IP addresses and the local options.

Embodiments are also provided for utilizing a gateway as a "pass-through" device or bridge for the assignment of IP addresses to one or more client devices in a shared subnet. The gateway may intercept a set of DHCP messages from a master DHCP server directed to the one or more client devices. The set of DHCP messages may be utilized to assign IP addresses for the one or more client devices. The set of DHCP messages may include a DHCP offer message and a DHCP acknowledgement message received from the master DHCP server. The gateway may bridge the set of DHCP messages from the gateway to the at least one client device.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing a gateway for the assignment of Internet protocol ("IP") addresses to client devices in a shared subnet. The gateway may include a dynamic host protocol configuration ("DHCP") proxy server. The proxy server may receive discover messages from the client devices. The proxy server may send proxy discover messages to a master DHCP server and receive offer messages containing IP addresses and local options. The proxy server may add/modify the local options to create proxy offer messages, send the proxy offer messages to the client devices and receive IP address request messages from the client devices. The proxy server may send proxy IP address request messages to the master DHCP server and receive acknowledgement messages. The proxy server may add/modify local options in the acknowledgement messages to create proxy acknowledgement messages and send the proxy acknowledgement messages to the client devices to assign the IP addresses and the local options.

Embodiments are also provided for utilizing a gateway as a "pass-through" device or bridge for the assignment of IP addresses to one or more client devices in a shared subnet. The gateway may intercept a set of DHCP messages from a master DHCP server directed to the one or more client devices. The set of DHCP messages may be utilized to assign IP addresses for the one or more client devices. The set of DHCP messages may include a DHCP offer message and a DHCP acknowledgement message received from the master DHCP server. The gateway may bridge the set of DHCP messages from the gateway to the at least one client device.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
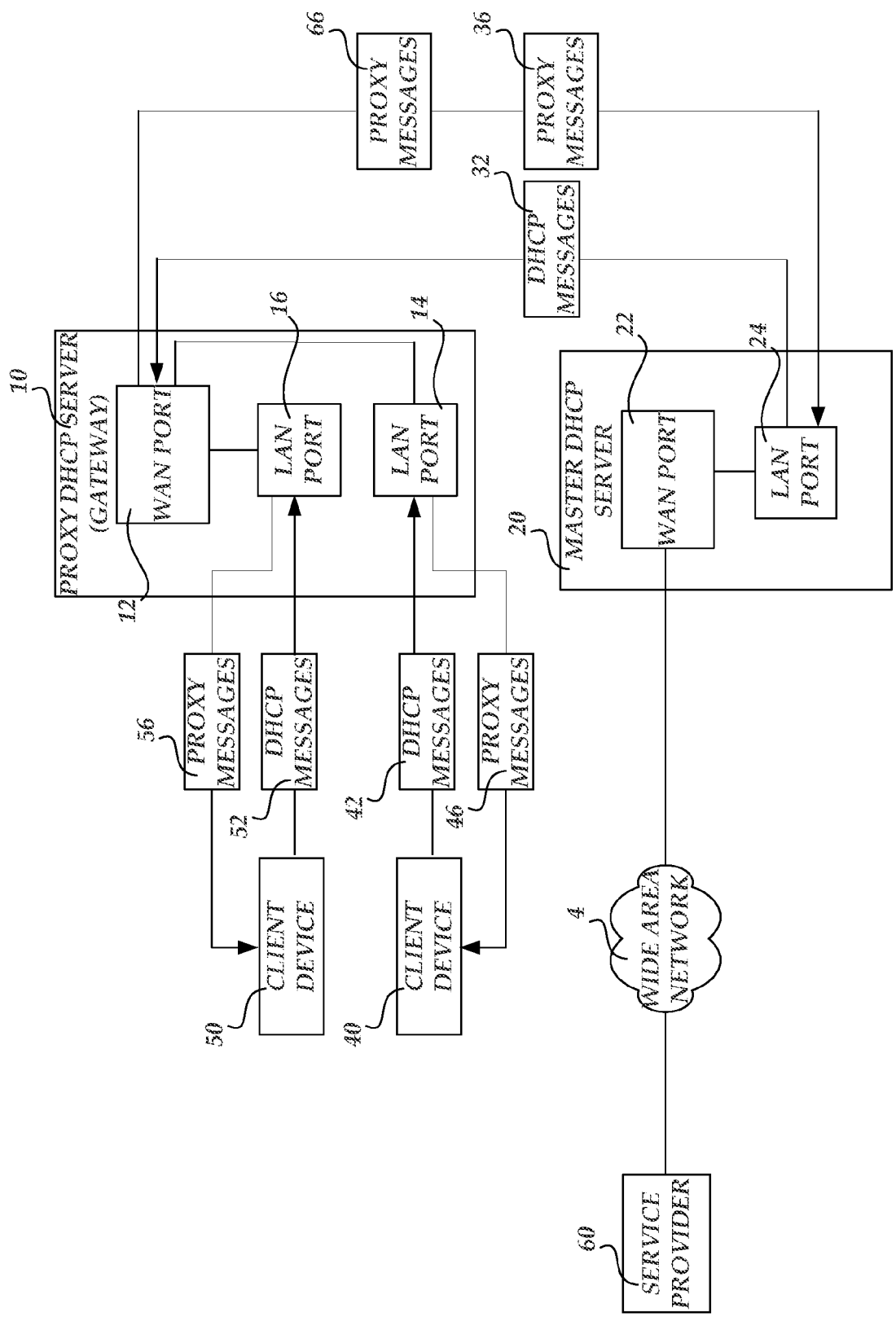
FIG. 1 is a block diagram illustrating a network architecture for utilizing a gateway for the assignment of Internet protocol ("IP") addresses to client devices in a shared subnet, in accordance with an embodiment.

Referring now to the drawings, in which like numerals represent like elements through the several figures, various aspects of the present invention will be described. FIG. 1 is a block diagram illustrating a network architecture for utilizing a gateway for the assignment of Internet protocol (IP) addresses to client devices in a shared subnet, in accordance with an embodiment. The network architecture includes a gateway which consists of a proxy dynamic control host protocol ("DHCP") server 10 (hereinafter referred to as the "proxy server 10"). The proxy server 10 includes a wide area network ("WAN") port 12, a local area network ("LAN") port 14 and a ("LAN") port 16. The WAN port 12 is in communication with a master DHCP server 20. In accordance with an embodiment, the WAN port 12 may be utilized to send proxy messages 36 and 66 to the master DHCP server 20 and receive DHCP messages 32 from the master DHCP server 20. The LAN port 14 is in communication with a client device 40 and the LAN port 16 is in communication with a client device 50. In accordance with an embodiment, the LAN port 14 may be utilized to send proxy messages 46 to the client device 40 and to receive DHCP messages 42 from the client device 40. Similarly, the LAN port 16 may be utilized to send proxy messages 56 to the client device 50 and to receive DHCP messages 52 from the client device 50. As will be described in greater detail below with respect to FIG. 5, the proxy server 10, in accordance with an embodiment, may utilize the proxy messages 36, 46, 56 and 66 to communicate DHCP messages between the client devices 40 and 50 and the master DHCP server 20 for the assignment of IP addresses to the client devices 40 and 50. Furthermore, the proxy server 10 may also utilize the proxy messages 36, 46, 56 and 66 to communicate local DHCP options to the client devices 40 and 50. As will be described in greater detail herein, the local DHCP options may include, without limitation, domain name system ("DNS") and default gateway addresses utilized in the subnet. It should be understood that other local DHCP options, known to those skilled in the art, may also be communicated to the client devices 40 and 50 in accordance with the various embodiments described herein.

The master DHCP server 20 may include a WAN port 22 and a LAN port 24. The WAN port 22 may be in communication with a service provider 60 over a WAN 4. The WAN 4 may comprise the Internet. The LAN port 24, which is in communication with the proxy server 10, may be utilized to send the DHCP messages 32 and receive the proxy messages 36 and 66 over the WAN port 12 of the proxy server 10. The DHCP messages 32 may be utilized to assign IP addresses to the client devices 40 and 50 which are in communication with the proxy server 10. The DHCP messages 32 will be described in greater detail below with respect to FIG. 3. In accordance with various embodiments, the service provider 60 may be utilized for providing a public Internet service, an IP video service, a voice over IP service or other IP service. It should further be appreciated that, in accordance with an alternative embodiment, the master DHCP server 20 may comprise additional WAN ports 22 for supporting routing to multiple service providers based on predetermined business rules. For example, a business rule may state that a first service provider may be used to provide a public Internet service while a second service provider may be used to provide an IP video service.

The client devices 40 and 50 may comprise general purpose desktop, laptop, handheld, tablet, or other types of computers capable of executing one or more applications. The client device 40 may communicate the DHCP messages 42 and receive the proxy messages 46 over the LAN port 14 in the proxy server 10. Similarly, the client device 50 may communicate the DHCP messages 52 and receive the proxy messages 56 over the LAN port 16 in the proxy server 10. The DHCP messages 42 and 52 may be utilized to discover and request IP addresses from the master DHCP server 20 (through the proxy server 10) for establishing a connection with the service provider 60. The DHCP messages 42 and 52 will be described in greater detail below with respect to FIG. 3.

Figure 2:
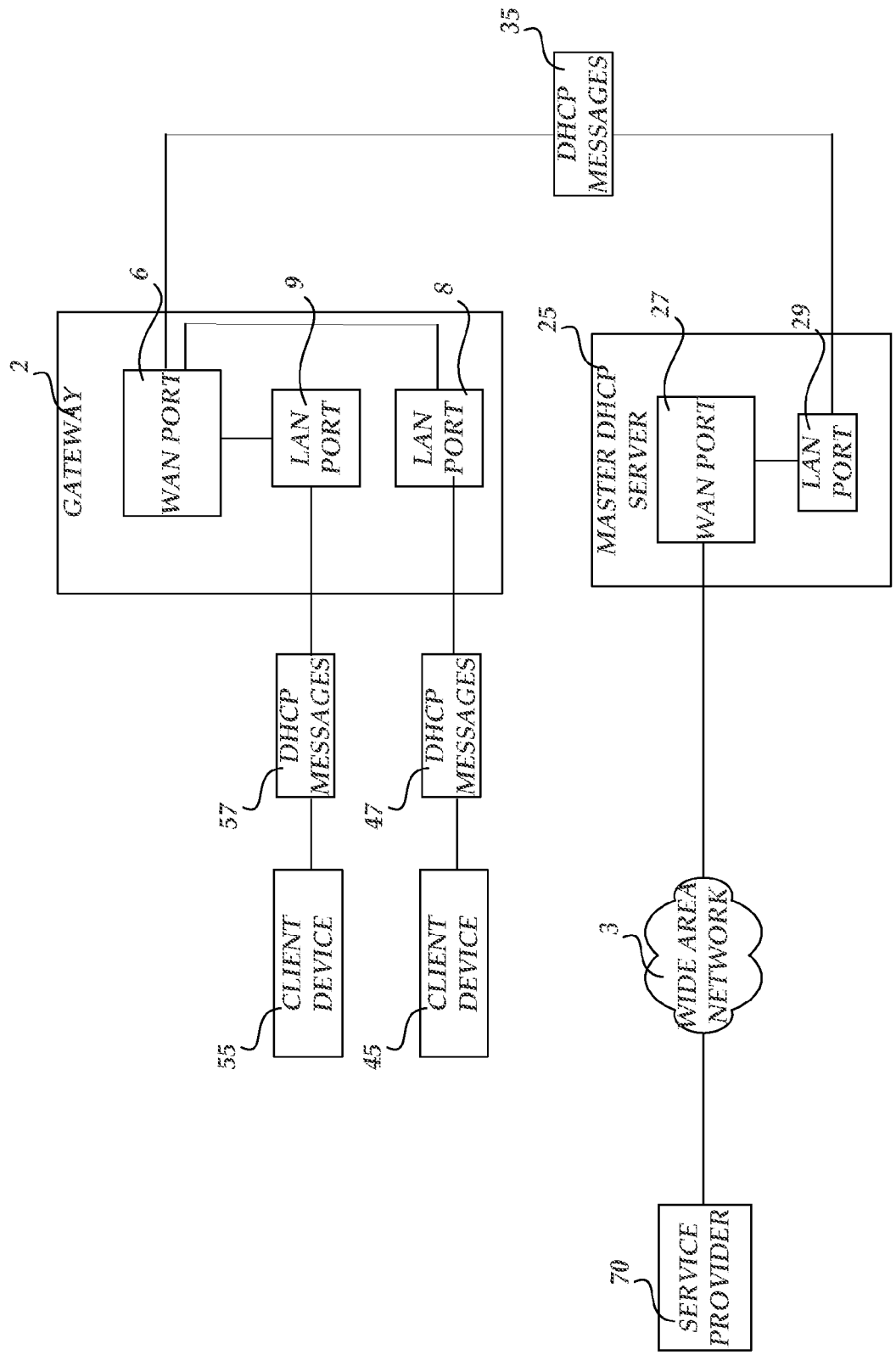
FIG. 2 is a block diagram illustrating a network architecture for utilizing a gateway for the assignment of Internet protocol ("IP") addresses to client devices in a shared subnet, in accordance with an alternative embodiment.

FIG. 2 is a block diagram illustrating a network architecture for utilizing a gateway for the assignment of Internet protocol ("IP") addresses to client devices in a shared subnet, in accordance with an alternative embodiment. The network architecture includes a gateway 2 which may further include a WAN port 6, a LAN port 8 and a LAN port 9. The WAN port 6 is in communication with a master DHCP server 25 and may be utilized to receive DHCP messages 35 from the master DHCP server 25. The LAN ports 8 and 9 are in communication with the client devices 45 and 55, respectively, and may be utilized to receive the DHCP messages 47 and 57 from the client devices 45 and 55. In accordance with an embodiment, and as will be described in greater detail below with respect to FIG. 6, the gateway 2 may be configured to intercept the DHCP messages 35 from the master DHCP server 25, which are destined for the client devices 45 and 55, and to bridge or "pass through" the DHCP messages 47 and 57, from the client devices 45 and 55, which are destined for the master DHCP server 25. The gateway 2 may also be configured to change or "mangle" the DHCP messages 35 received from the master DHCP server 25 in order to add local DHCP options.

The master DHCP server 25 may include a WAN port 27 and a LAN port 29. The WAN port 27 may be in communication with a service provider 70 over a WAN 3. The WAN 3 may comprise the Internet. The LAN port 29, which is in communication with the gateway 2, may be utilized to send the DHCP messages 35 and receive the DHCP messages 47 and 57 over the WAN port 6 of the gateway 2. The DHCP messages 35 may be utilized to assign IP addresses to the client devices 45 and 55 which are in communication with the gateway 2. The DHCP messages 35 will be described in greater detail below with respect to FIG. 4. In accordance with various embodiments, the service provider 70 may be utilized for providing a public Internet service, an IP video service, a voice over IP service or other IP service. It should further be appreciated that, in accordance with an alternative embodiment, the master DHCP server 25 may comprise additional WAN ports 27 for supporting routing to multiple service providers based on predetermined business rules. For example, a business rule may state that a first service provider may be used to provide a public Internet service while a second service provider may be used to provide an IP video service.

The client devices 45 and 55 may comprise general purpose desktop, laptop, handheld, tablet, or other types of computers capable of executing one or more applications. The client device 45 may communicate the DHCP messages 47 over the LAN port 8 in the gateway 2. Similarly, the client device 55 may communicate the DHCP messages 57 over the LAN port 9 in the gateway 2. The DHCP messages 47 and 57 may be utilized to discover and request IP addresses from the master DHCP server 25 (through the gateway 2) for establishing a connection with the service provider 70. The DHCP messages 47 and 57 will be described in greater detail below with respect to FIG. 4.

Figure 3:
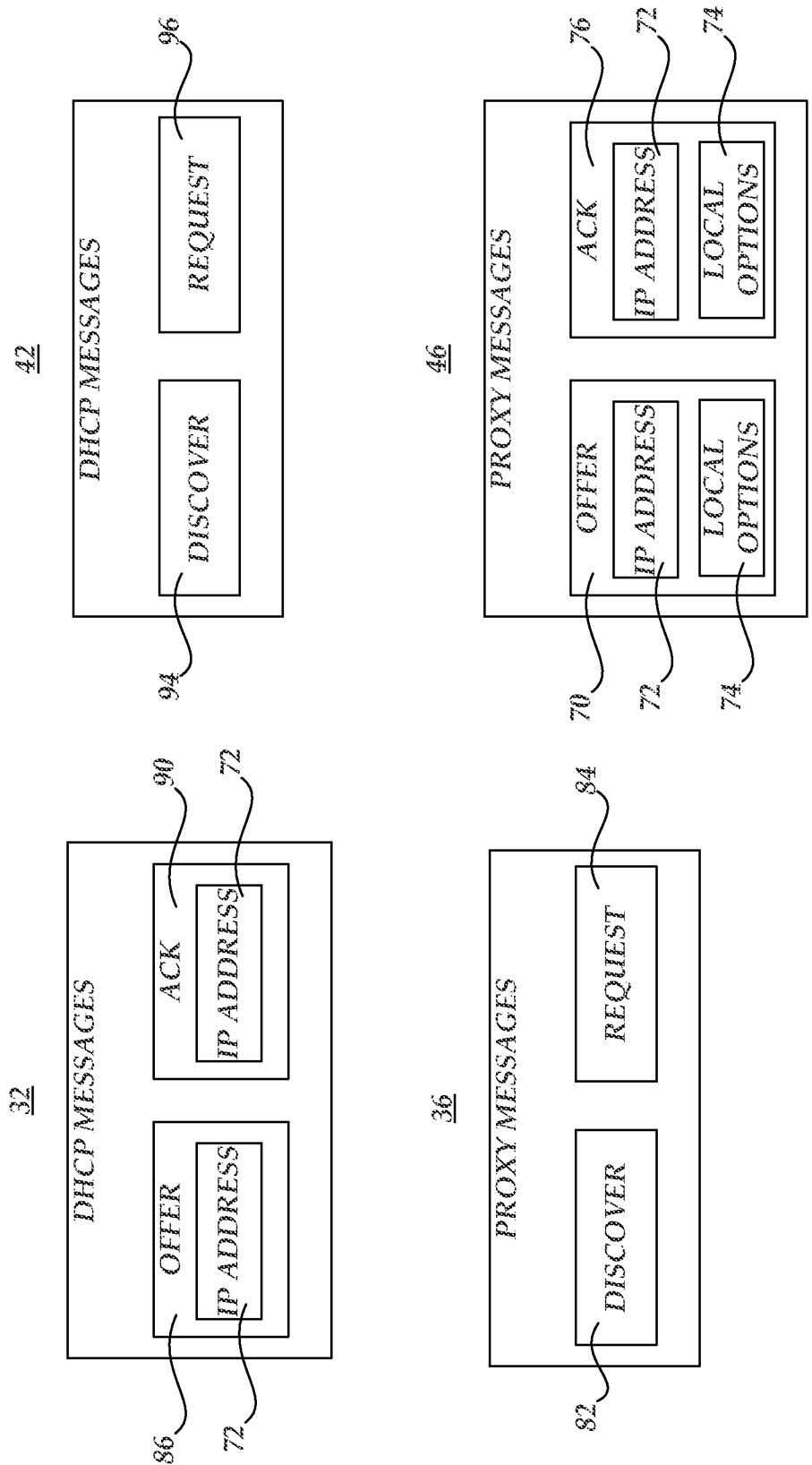
FIG. 3 is a block diagram illustrating the contents of various messages utilized in the network architecture of FIG. 1, in accordance with an embodiment.

FIG. 3 is a block diagram illustrating the contents of the DHCP messages 32 and 42 as well as the proxy messages 36 and 56, in accordance with an embodiment. The DHCP messages 32, which are generated by the master DHCP server 20, may include an offer message 86 and an "ACK" (i.e., "acknowledgement") message 90. As should be understood by those skilled in the art, the offer message 86 may comprise a DHCP offer message and the acknowledgement message 90 may comprise a DHCP acknowledgement message. The offer message 86 may include an IP address 72 for tendering to one of the client devices 40 or 50 and may be communicated to the proxy server 10 by the master DHCP server 20 in response to a DHCP discover message. The acknowledgement message 90 may also include the IP address 72 and may be communicated to the proxy server 10 by the master DHCP server 20 in response to a DHCP request message. The DHCP messages 42, which are generated by the client device 40, may include a discover message 94 and a request message 96. As should be understood by those skilled in the art, the discover message 94 may comprise a DHCP discover message and the request message 96 may comprise a DHCP request message. The discover message 94 may be communicated to the proxy server 10 by the client device 40 to initiate a request for an IP address. The request message 96 may be communicated to the proxy server 10 by the client device 40 to send the request for an IP address to the master DHCP server 20. The proxy messages 36, which are generated by the proxy server 10, may include a proxy discover message 82 and a proxy request message 84. It should be understood that the proxy messages 36 may be proxies of the discover and request messages 94 and 96 generated by the client device 40. The proxy messages 46, which are generated by the proxy server 10, may include a proxy offer message 70 and a proxy acknowledgement message 76. The proxy offer message 70 and the proxy acknowledgment message 90 may include the IP address 72 and the local options 74. It should be understood that the DHCP messages 52 shown in FIG. 1 above, include the same messages as the DHCP messages 42. It should further be understood that the proxy messages 56, shown in FIG. 1 above, include the same messages as the proxy messages 46 and that the proxy messages 66, shown in FIG. 1 above, include the same messages as the proxy messages 36.

Figure 4:
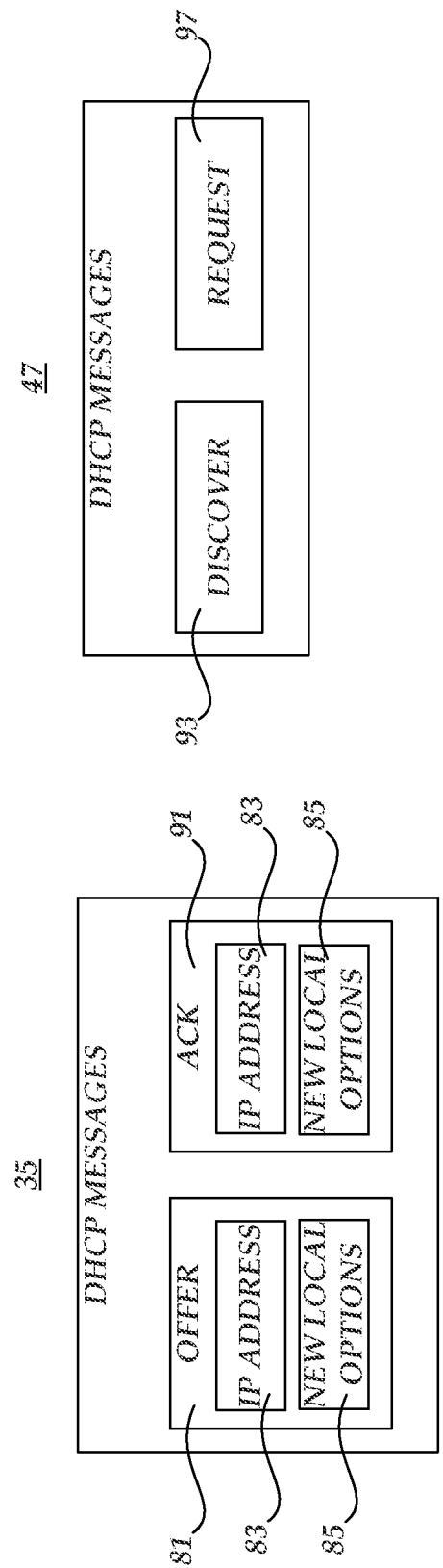
FIG. 4 is a block diagram illustrating the contents of various messages utilized in the network architecture of FIG. 2, in accordance with an embodiment.

FIG. 4 is a block diagram illustrating the contents of the DHCP messages 35 and 47, in accordance with an embodiment. The DHCP messages 35, which are generated by the master DHCP server 25, may include an offer message 81 and an "ACK" (i.e., "acknowledgement") message 91. As should be understood by those skilled in the art, the offer message 81 may comprise a DHCP offer message and the acknowledgement message 91 may comprise a DHCP acknowledgement message. The offer message 81 may include an IP address 83 for tendering to one of the client devices 45 or 55 and may be communicated to the gateway 2 by the master DHCP server 25 in response to a DHCP discover message. The acknowledgement message 91 may also include the IP address 83 and may be communicated to the gateway 2 by the master DHCP server 25 in response to a DHCP request message. It should be understood that, in accordance with an embodiment, the offer and acknowledgement messages 81 and 91 may also be changed by the gateway 2 to include new local options 85, as will be described in greater detail below with respect to FIG. 6. The DHCP messages 47, which are generated by the client device 45, may include a discover message 93 and a request message 97. As should be understood by those skilled in the art, the discover message 93 may comprise a DHCP discover message and the request message 97 may comprise a DHCP request message. The discover message 93 may be communicated to the gateway 2 by the client device 45 to initiate a request for an IP address. The request message 97 may be communicated to the gateway 2 by the client device 45 to send the request for an IP address to the master DHCP server 25. It should be understood that the DHCP messages 57 shown in FIG. 2 above, include the same messages as the DHCP messages 47.

Figure 5:
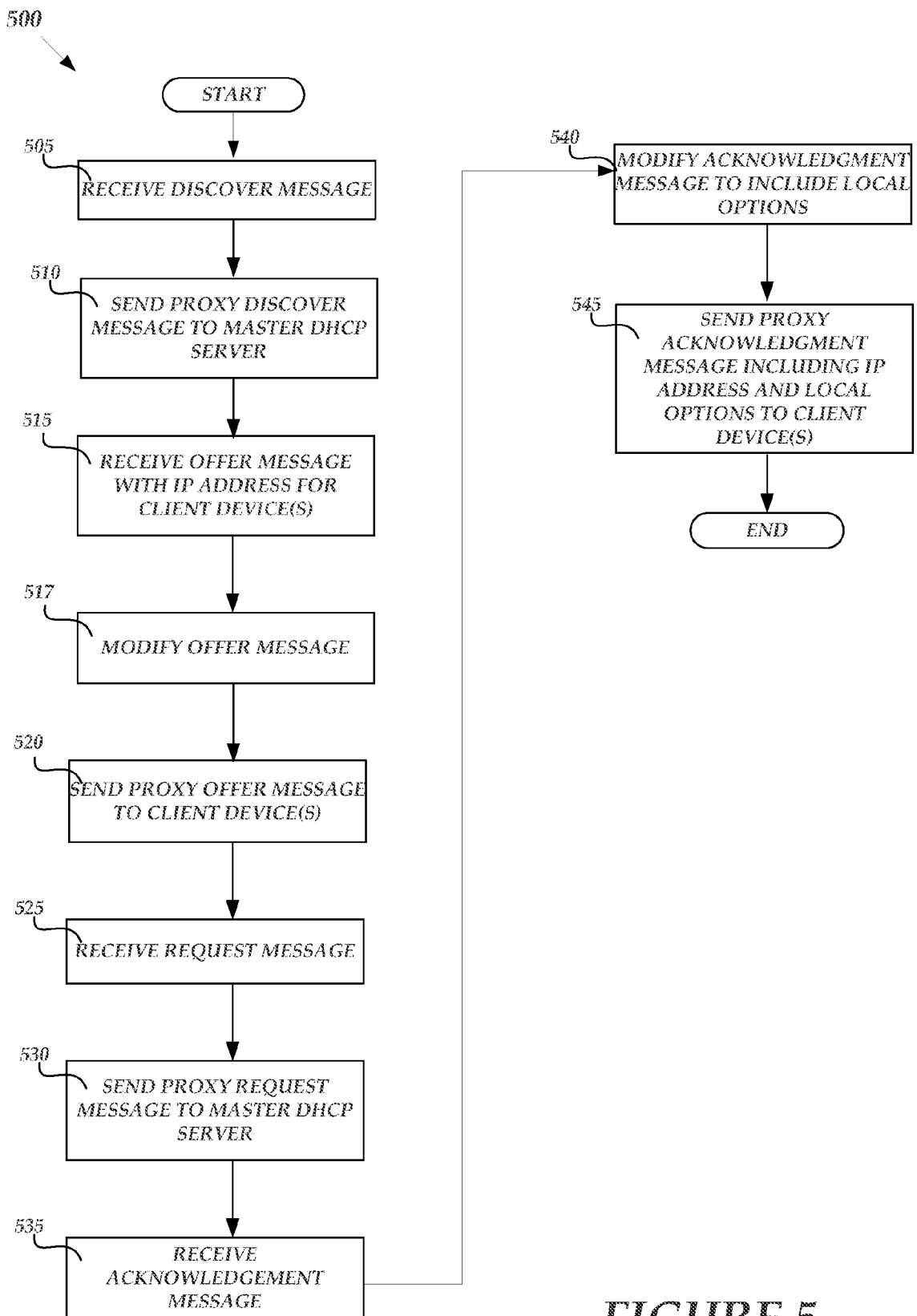
FIG. 5 is a flow diagram illustrating a routine for utilizing a gateway for the assignment of Internet protocol ("IP") addresses to client devices in a shared subnet, in accordance with an embodiment.

FIG. 5 is a flow diagram illustrating a routine 500 for utilizing a gateway for the assignment of Internet protocol ("IP") addresses to client devices in a shared subnet, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 5-6 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 500 begins at operation 505 where the proxy server 10 receives a discover message from a client device in the subnet. In particular, the proxy server 10 may receive the discover message 94 from the client device 40. In accordance with an embodiment, the proxy server 10 may receive DHCP discover messages from multiple client devices such as the client devices 40 and 50 discussed above.

From operation 505, the routine 500 continues to operation 510 where the proxy server 10 sends a proxy discover message to the master DHCP server 20. In particular, the proxy server 10 may create a proxy of the discover message 94 received from the client device 40 and send the proxy discover message 82 to the master DHCP server 20. In accordance with an embodiment, the proxy server 10 may create proxies of multiple discover messages received from multiple clients and send multiple proxy discover messages to the master DHCP server 20. In accordance with an embodiment, the proxy server 10 may utilize a media access control ("MAC") address of one or more client devices to send the proxy discover messages to the master DHCP server 20.

From operation 505, the routine 500 continues to operation 515 where the proxy server 10 receives an offer message from the master DHCP server 20. The offer message may include an IP address for tendering to the client device 40. In particular, the proxy server 10 may receive the offer message 86, generated by the master DHCP server 20, which includes the IP address 88. In accordance with an embodiment, the proxy server 10 may receive multiple offer messages including multiple IP addresses for tendering to multiple client devices.

From operation 515, the routine 500 continues to operation 517 where the proxy server 10 modifies the offer message received from the master DHCP server 20. In particular, the proxy server 10 may modify the offer message by adding local options to the offer message or modifying local options for the offer message. For example, the proxy server 10 may add or modify the local options 74 for the offer message 86.

From operation 517, the routine 500 continues to operation 520 where the proxy server 10 creates and sends a proxy offer message to the client device 40 (or alternatively, creates and sends multiple proxy offer messages to multiple client devices). For example, the proxy server 10 may send the proxy offer message 70 to the client device 40. In accordance with an embodiment, the proxy server 10 may create proxies of each received offer message from the DHCP server 20 and may then send the proxy offer messages to client devices in response to received discover messages. The proxy offer message may include the IP address (e.g., the IP address 72) received from the master DHCP server 20. In accordance with an embodiment, the proxy server 10 may also be configured to include additional or modified local options (e.g., the local options 74) in the proxy offer messages sent to the client devices. As discussed above with respect to FIG. 1, the local options may include DNS IP addresses and default gateway addresses. The DNS IP addresses and the default gateway addresses may be utilized to support multiple service providers.

From operation 520, the routine 500 continues to operation 525 where the proxy server 10 receives a request message from a client device (or alternatively, multiple request messages from multiple client devices). For example, the proxy server 10 may receive the request message 96 from the client device 40. The request message may include a request for the IP address included in the proxy offer message sent at operation 520.

From operation 525, the routine 500 continues to operation 530 where the proxy server 10 sends a proxy request message to the master DHCP server 20. In particular, the proxy server 10 may create a proxy of the request message 96 received from the client device 40 and send the proxy request message 84 to the master DHCP server 20. In accordance with an embodiment, the proxy server 10 may create proxies of multiple request messages received from multiple clients and send multiple proxy request messages to the master DHCP server 20.

From operation 530, the routine 500 continues to operation 535 where the proxy server 10 receives an acknowledgement message from the master DHCP server 20 (or alternatively, multiple acknowledgement messages for multiple client devices). For example, the proxy server 10 may receive the acknowledgment message 90 from the client device 40. The acknowledgment message may include the requested IP address (e.g., the IP address 92) included in the proxy offer message sent at operation 520.

From operation 535, the routine 500 continues to operation 540 where the proxy server 10 may modify the acknowledgement message received at operation 535 to include local DHCP options. For example, the proxy server 10 may modify the acknowledgement message 90 to add or modify the local options 74 which may further include DNS server IP addresses and default gateway addresses. The DNS server IP addresses and the default gateway addresses may be utilized to support multiple service providers.

It should be understood that in accordance with the various embodiments described herein, the modification of acknowledgment messages to include local DHCP options is optional. In particular, the proxy server 10 may be configured to include or not include local DHCP options in acknowledgement messages received from the master DHCP server 20.

From operation 540, the routine 500 continues to operation 545 where the proxy server 10 creates and sends a proxy acknowledgment message to a client device (or alternatively, sends multiple proxy acknowledgement messages to multiple client devices). For example, the proxy server 10 may send the proxy acknowledgment message 76 to the client device 40. In accordance with an embodiment, the proxy server 10 may create proxies of each received acknowledgement message from the DHCP server 20 and may then send the proxy acknowledgment to client devices in response to received request messages. The proxy acknowledgment message may include the IP address (e.g., the IP address 72) received from the master DHCP server 20 and may further include local options (e.g., the local options 74). From operation 545, the routine 500 then ends.

Figure 6:
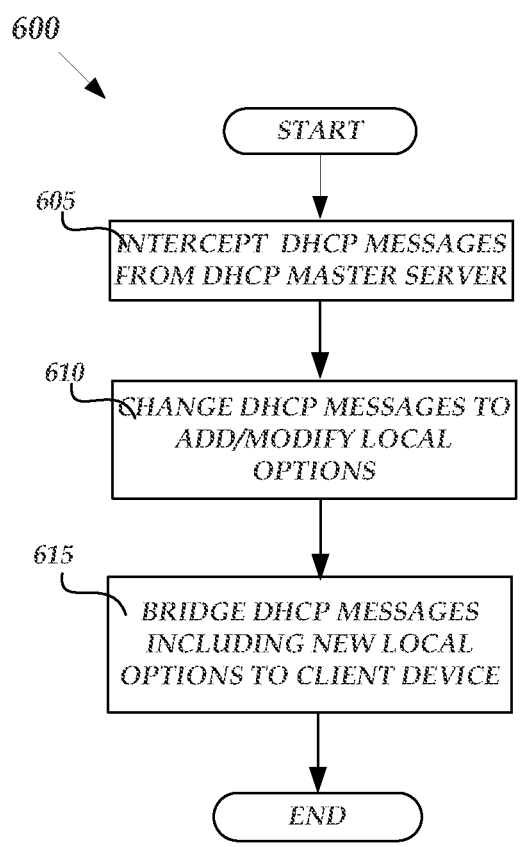
FIG. 6 is a flow diagram illustrating a routine for utilizing a gateway for the assignment of Internet protocol ("IP") addresses to client devices in a shared subnet, in accordance with an alternative embodiment.

FIG. 6 is a flow diagram illustrating a routine 600 for utilizing a gateway for the assignment of Internet protocol ("IP") addresses to client devices in a shared subnet, in accordance with an alternative embodiment. The routine 600 begins at operation 605 where the gateway 2 intercepts DHCP messages from the master DHCP server 25. For example, the gateway 2 may receive the DHCP offer message 81 and the DHCP acknowledgement message 91.

From operation 605, the routine 600 continues to operation 610 where the gateway 2 changes the set of DHCP messages intercepted from the master DHCP server 25 to include additional or modified local options. The additional or modified local options may include the new local options 85 in the DHCP messages 35 shown in FIG. 4. For example, the gateway 2 may change the DHCP offer message 81 to include additional or modified DNS server Internet protocol IP and gateway addresses associated with the one or more of the client devices 40 and 50. The gateway 2 may also change the DHCP acknowledgement message 91 to include the additional or modified DNS server IP and gateway address associated with the one or more of the client devices 40 and 50. It should be understood, that, in accordance with an embodiment, the gateway 2 may change a default gateway IP address previously provisioned for a client device in the subnet to a new IP address. The DNS server IP addresses and the default gateway addresses may be utilized to support multiple service providers.

From operation 610, the routine 600 continues to operation 615 where the gateway 2 bridges the DHCP messages intercepted from the master DHCP server 25 to one or more of the client devices 40 and 50. In particular, the gateway 2 may bridge (or pass-through) the changed DHCP offer message 81 and the changed DHCP acknowledgement message 97 to the client devices 40 and/or 50. From operation 615, the routine 600 then ends.

It should be understood that in accordance with the above-described embodiments, client devices located on a gateway's LAN ports may be provisioned from a common IP subnet shared with client devices on other LAN ports at the same location (e.g., in a home) while avoiding IP address conflicts and while providing local provisioning of DHCP options. The local DHCP options may be utilized to provide additional services to the client devices, such as DNS server IP addresses and different default gateway IP addresses, thereby allowing client devices to use residential gateways with advanced features such as multiple WAN interfaces and routing support to multiple service providers based on specific business rules. The specific business rules may include rules such as: (1) Service Provider 1 can be used to provide Internet Service; (2) Service Provider 2 can be used to provide IP Video service.

Although the invention has been described in connection with various illustrative embodiments, those of ordinary skill in the art will understand that many modifications can be made thereto within the scope of the claims that follow. For example, the subnets in the network architectures discussed above may include more than two client devices as well as multiple master DHCP servers and multiple service providers. Accordingly, it is not intended that the scope of the invention in any way be limited by the above description, but instead be determined entirely by reference to the claims that follow.

What is claimed is:

1. A method of utilizing a gateway for the assignment of Internet protocol (IP) addresses to client devices in a shared subnet, comprising:
   receiving, at a dynamic host protocol configuration (DHCP) proxy server in the gateway, a discover message from at least one client device;
   sending, from the DHCP proxy server, a proxy discover message to a master DHCP server;
   receiving, at the DHCP proxy server, an offer message containing an IP address from the master DHCP server;
   sending, from the DHCP proxy server, a proxy offer message to the at least one client device;
   receiving, at the DHCP proxy server, a request message from the at least one client device, the request message comprising a request for the IP address;
   sending, from the DHCP proxy server, a proxy request message to the master DHCP server;
   receiving, at the DHCP proxy server, an acknowledgement message from the master DHCP server; and
   sending, from the DHCP proxy server, a proxy acknowledgement message to the at least one client device to assign the IP address.

2. The method of claim 1, wherein sending, from the DHCP proxy server, the proxy discover message to a master DHCP server comprises utilizing a media access control (MAC) address of the at least one client device to send the proxy discover message.

3. The method of claim 1, wherein sending, from the DHCP proxy server, the proxy request message to the master DHCP server comprises utilizing a MAC address of the at least one client device to send the proxy request message.

4. The method of claim 1, further comprising modifying the offer message received from the master DHCP server prior to sending the proxy offer message to the at least one client device, wherein modifying the offer message comprises at least one of adding local options to the offer message and modifying local options for the offer message.

5. The method of claim 4, wherein sending, from the DHCP proxy server, the proxy offer message to the at least one client device comprises sending at least one of the added local options and the modified local options to the at least one client device, wherein sending at least one of the added local options and the modified local options to the at least one client device comprises sending at least one of additional domain name system (DNS) addresses and modified DNS addresses to the at least one client device, the at least one of additional DNS addresses and modified DNS addresses being utilized for supporting a plurality of service providers.

6. The method of claim 4, wherein sending, from the DHCP proxy server, the proxy offer message to the at least one client device comprises sending at least one of the added local options and the modified local options to the at least one client device, wherein sending at least one of the added local options and the modified local options to the at least one client device comprises sending at least one of an additional default gateway address and a modified default gateway address to the at least one client device, the at least one of an additional default gateway address and a modified default gateway address being utilized for supporting a plurality of service providers.

7. The method of claim 1, further comprising modifying the acknowledgement message received from the master DHCP server prior to sending the proxy acknowledgement message to the at least one client device, wherein modifying the acknowledgement message received from the master DHCP server prior to sending the proxy acknowledgement message to the at least one client device comprises at least one of adding local options to the acknowledgement message and modifying local options for the acknowledgement message.

8. The method of claim 7, wherein sending, from the DHCP proxy server, a proxy acknowledgement message to the at least one client device to assign the IP address comprises sending at least one of the added local options and the modified local options to the at least one client device, wherein sending the at least one of the added local options and the modified local options to the at least one client device comprises sending at least one of additional DNS addresses and modified DNS addresses to the at least one client device, the at least one of additional DNS addresses and modified DNS addresses being utilized for supporting a plurality of service providers.

9. The method of claim 7, wherein sending, from the DHCP proxy server, a proxy acknowledgement message to the at least one client device to assign the IP address comprises sending at least one of the added local options and the modified local options to the at least one client device, wherein sending the at least one of the added local options and the modified local options to the at least one client device comprises sending at least one of an additional default gateway address and a modified default gateway address to the at least one client device, the at least one of an additional default gateway address and a modified default gateway address being utilized for supporting a plurality of service providers.

10. A system for assigning Internet protocol (IP) addresses to client devices in a shared subnet, comprising:
   a master dynamic host configuration protocol (DHCP) server;
   at least one client device; and
   a proxy DHCP server in communication with the master DHCP server and the at least one client device, wherein the proxy DHCP server is operative to:
      receive DHCP discover messages from the at least one client device;
      send proxy DHCP discover messages to the master DHCP server;
      receive DHCP offer messages containing IP addresses from the master DHCP server for the at least one client device;

send proxy DHCP offer messages to the at least one client device, the proxy DHCP offer messages including local options;
receive DHCP request messages from the at least one client device;
send proxy DHCP request messages to the master DHCP server;
receive DHCP acknowledgement messages for the at least one client device; and
send proxy DHCP acknowledgement messages to the at least one client device to assign the IP addresses to the at least one client device.

11. The system of claim 10, wherein the DHCP proxy server is further operative to utilize media access control (MAC) addresses for the at least one client device in sending the proxy DHCP discover messages and the proxy DHCP request messages to the master DHCP server.

12. The system of claim 10, wherein the DHCP proxy server is further operative to modify the offer message received from the master DHCP server prior to sending the proxy offer message to the at least one client device, wherein modifying the offer message comprises at least one of adding local options to the offer message and modifying local options for the offer message.

13. The system of claim 12, wherein the proxy DHCP server is further operative to modify the DHCP acknowledgement messages received from the master DHCP server prior to sending the proxy DHCP acknowledgement messages to the first and second client devices, wherein modifying the offer message comprises at least one of adding local options to the acknowledgement message and modifying local options for the acknowledgement message.

14. The system of claim 13, wherein the local options comprises at least one of domain name system (DNS) addresses and default gateway addresses.

15. The system of claim 14, wherein the DNS addresses and the default gateway addresses are utilized for supporting a plurality of service providers.

16. A method of utilizing a gateway for the assignment of Internet protocol (IP) addresses to client devices in a shared subnet, comprising:
providing a gateway for use as a bridge between at least one client device and a master dynamic host protocol configuration (DHCP) server;
intercepting, at the gateway, a set of DHCP messages from the master DHCP server directed to the at least one client device, the set of DHCP messages being utilized to assign the IP address for the at least one client device, the set of DHCP messages comprising a DHCP offer message and a DHCP acknowledgement message received from the master DHCP server; and
bridging the set of DHCP messages from the gateway to the at least one client device.

17. The method of claim 16, further comprising changing the set of DHCP messages intercepted from the master DHCP server to include at least one of additional local options and modified local options prior to bridging the set of DHCP messages to the at least one client device.

18. The method of claim 17, wherein changing the set of DHCP messages intercepted from the master DHCP server to include at least one of additional local options and modified local options prior to bridging the set of DHCP messages to the at least one client device comprises:
changing the DHCP offer message to include at least one of an additional and a modified domain name system (DNS) Internet protocol (IP) address associated with the at least one client device; and
changing the DHCP acknowledgement message to include the at least one of the additional and the modified DNS IP address associated with the at least one client device.

19. The method of claim 17, wherein changing the set of DHCP messages intercepted from the master DHCP server to include at least one of additional local options and modified local options prior to bridging the set of DHCP messages to the at least one client device comprises:
changing the DHCP offer message to include at least one of an additional and a modified default gateway address associated with the at least one client device; and
changing the DHCP acknowledgement message to include the at least one of the additional and the modified default gateway address associated with the at least one client device.

20. The method of claim 17, wherein changing the set of DHCP messages intercepted from the master DHCP server to include at least one of additional local options and modified local options prior to bridging the set of DHCP messages to the at least one client device comprises changing the set of DHCP messages to support a plurality of service providers.

* * * * *